United States Patent Office 2,891,879
Patented June 23, 1959

2,891,879

BLACK COATING OF HIGH THERMAL EMISSIVITY AND PROCESS FOR APPLYING THE SAME

Kenneth L. Rohrer, Elmira, N.Y., assignor to Westinghouse Electric Corporation, East Pittsburgh, Pa., a corporation of Pennsylvania No Drawing. Application July 26, 1957
Serial No. 674,309

4 Claims. (Cl. 117—201)

This invention relates to a black coating and, more particularly, to an adherent black coating suitable for use in electronic discharge devices which coating has high thermal dissipation and low reflectivity.

The problem of obtaining a good adherent black coating for dissipation of heat and having a low reflectivity is one of long standing. The ideal black finish would be one possessing good appearance and good adherence at high temperatures in reducing and oxidizing atmospheres, in addition to stability in a vacuum. At present, various methods of obtaining black coatings are used, which methods include black chrome plating, gas carbonization, black nickel plating, black molybdenum plating, aluminum-clad steel, etc. While these various coatings will work in some circumstances and are adequate for some purposes, it has been found that they have certain disadvantages. For example, the black chrome plating, while possessing a good finish, is not usually reproducible; the black nickel plating and the black molybdenum plating are usually oxidized and reduced and are not resistant to high temperatures; gas carbonizing treatment sometimes imparts a brittleness and hardness of surface to the metals and frequently is of poor adherence. Also, some black coatings require fairly complicated application procedures and may be applied only to certain surfaces. In addition, such materials as nickel are not overly abundant and are frequently comparatively expensive.

I have found that an excellent adherent, heat dissipating, low reflectivity black coating, which is particularly suitable for use in electron discharge devices, may be made by heating finely divided aluminum in an organopolysiloxane vehicle in a nonoxidizing atmosphere at a temperature above 660° C.

Therefore, it is an object of this invention to provide an improved black coating having good adherence, low reflectivity and high thermal emissivity.

It is another object to provide an improved black coating which will withstand high temperature conditions.

It is a further object to provide an improved black coating which may be applied on nearly any metal, glass or ceramic surface.

It is an additional object to provide a black coating which requires a minimum of heat treatment.

It is an auxiliary object to provide an improved black coating which will withstand high temperature conditions in reducing atmospheres and oxidizing atmospheres, in vacuum and in air.

It is a supplementary object to provide an improved black coating which may be applied to a base member, which base member may then be shaped, formed or otherwise treated.

It is still another object to provide an improved black coating which is particularly suitable for use in electron discharge devices.

These and other objects of my invention will be apparent from the following description.

I have discovered an improved black coating which may be formed by mixing one part by weight of finely divided aluminum and from 0.35 to 20 parts by weight of an organopolysiloxane resin having a recurring

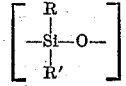

group, wherein R and R' may be the same or different aliphatic, such as methyl, ethyl, propyl or isopropyl; aromatic, such as phenol or substituted phenol; hydrocarbonoxy, such as methoxy, ethoxy or aryloxy; halogen; or amine. In some instances, it may be desirable to mix the above-mentioned organopolysiloxane with a suitable solvent, such as butyl acetate or toluene. The ratio of the organopolysiloxane to the solvent may vary from 0.35 part organopolysiloxane to 20 parts solvent up to 100% organopolysiloxane. There should be a ratio of one part of aluminum to from 0.45 to 360 parts of organopolysiloxane and solvent combined.

After the above materials have been properly mixed, they are applied to a suitable base member by any of a variety of methods, such as spraying, dipping, dragcoating, printing, etc. The base member may be a metal, such as steel, iron, stainless steel, nickel, molybdenum, etc., or may be glass or ceramic depending upon the use to which the member is to be put. Also, the ratios of the various constituents of the above mixture may vary within the above limits, depending upon the method of application used, the size of the base member to which the coating is applied and the use to which the coated member is to be put.

After the mixture has been applied to the base member, it is then heated in a suitable nonoxidizing atmosphere temperature between 660° C. and 1500° C. Suitable nonoxidizing atmospheres I have used included inert gases, such as argon, neon, etc., so-called wet or dry "cracked ammonia" atmosphere (a stoichiometric ratio of nitrogen and hydrogen which is obtained by disassociating ammonia gas), hydrogen, other reducing atmospheres or a vacuum. It is, of course, understood that in the specification and claims, the term "nonoxidizing atmosphere" includes a vacuum.

A particular mixture that has been used for spraying small pieces has included 1 part organopolysiloxane resin to 17 parts of solvent. One gram of finely divided aluminum is used per 20 grams of the above solution. A particular organopolysiloxane I have found to be suitable is a phenyl methyl polysiloxane resin having from 1.3 to 1.95 phenyl and methyl groups per silicon atom. While I have found many organopolysiloxanes to be suitable, those phenyl methyl polysiloxane varnishes which are known by the designation of Dow-Corning 997, 990, 994 and 991 give a suitable coating with good appearance and excellent adherence. A suitable solvent which may be used in the above mixture is butyl acetate.

After the above mixture has been sprayed upon the base member, for example steel, it is then heated in the above-mentioned cracked ammonia atmosphere at a temperature of about 900° C. for a period of five minutes. I have found that the blackening begins at the melting point of aluminum, namely, 660° C., and becomes complete within a very short time. With the particular materials used in the above example, 900° C. has been found to give the best appearance with the best adherence, but black coatings of adequate adherence may be obtained anywhere above 660° C. to approximately 1500° C. within a very few minutes.

When the spray method is used with large parts, I have found that one part organopolysiloxane to nine parts of solvent provides a suitable vehicle. For the above mixture, from 1 to 2 grams of finely divided aluminum per 20 grams of vehicle is a suitable coating.

A particular dipping mixture I have used includes 33 grams of commercial aluminum paste (powdered aluminum and mineral spirits) with 33 grams of one of the above-mentioned phenyl methyl polysiloxane vehicles (50% polysiloxane and 50% xylene) and 163 grams of toluene.

The above ratios may be varied depending upon whether a light coating or a heavy coating is desired. However, I have found that for particularly good heat dissipation, the amount of aluminum should not exceed the amount of silicon in the organopolysiloxane material. I have found that coatings made of the above materials and applied in the above manner still maintain their black appearances and adherence after continued firing at 1500° C. in a cracked ammonia atmosphere and at excess of 800° C. in a vacuum. Therefore, it can readily be seen that coatings of this nature are particularly suitable for use in electron discharge devices. I have found that an anode, made of an inexpensive material such as steel and coated with the above coating, provides excellent thermally emissive surfaces, possesses low reflectivity, possesses long life and evolves relatively little gas. For example, a steel anode coated by my process was subjected to a series of R.F. heatings in a vacuum and evolved a total of from 49.6 to 57 $l\mu$ (liter microns) of gas per gram of metal. Also, the amount of the gas evolved from the final heating was 0.7 to 3.6 $l\mu$ per gram of metal. A commercially available carbonized nickel was subjected to the same treatment and evolved a total of 131 $l\mu$ of gas per gram of metal and on the final heating, evolved 13 $l\mu$ of gas per gram of metal. A typical example of gas clean-up time for a black coating upon a steel anode is two hours compared to the 100 hours which is normally used today in production anodes utilizing carbonized nickel.

In addition, an electron discharge device using my black coated parts has a better life than an electron discharge device with the currently used carbonized nickel parts, has comparable grid emission life and has comparable initial shrinkage in production. Also, the blackening of anodes operating at a red heat is feasible utilizing my invention, which makes possible the use of heat resistant anode materials at excessively high temperatures. This was heretofore impossible, when using the commercially available materials such as carbonized nickel. Also, the coating of my invention will not peel or burn off at high firing temperatures as does the currently used carbonized nickel on occasion. Although the absolute maximum temperatures which my material will withstand have not been ascertained, the coating has survived temperatures of 1500° C. in certain atmospheres.

Another advantage of my invention is that no loose particles are evident utilizing the above black coating. Even if the coating is rubbed on a white cloth there is no black material on the cloth.

I have applied the black coating to anodes for receiving tubes and also anodes and grids for gas-filled thyratrons. Of course, a member coated with my black coating will be useful in many other applications.

Usually the coating applied according to the above description is less than 0.2 mil thick and also shows no interface between the coating and a suitable base such as nickel.

While the present invention has been disclosed in a few forms only, it will be obvious to those skilled in the art that it is not so limited but is susceptible to various changes and modifications without departing from the spirit and scope thereof.

I claim as my invention:

1. The method of making a heat-dissipating, low reflectivity, adherent black coating, said method including the steps of (1) mixing (a) one part by weight of finely divided aluminum, and (b) from 0.35 to 20 parts by weight of an organopolysiloxane resin, (2) applying said mixture to a base member, and (3) heating said base member and said mixture in a nonoxidizing atmosphere to a temperature between 660° C. and 1500° C.

2. The method of making a heat-dissipating, low reflectivity, adherent black coating, said method including the steps of (1) mixing (a) one part by weight of finely divided aluminum (b) from 0.35 to 20 parts by weight of a solvent soluble organopolysiloxane resin, and (c) from 0.1 to 20 parts by weight of a solvent for said organopolysiloxane with a ratio of (a) to the total weight of (b) and (c) being one part to from 0.45 to 360 parts, (2) applying said mixture to a base member, and (3) heating said base member and said mixture in a non-oxidizing atmosphere to a temperature between 660° C. and 1500° C.

3. An article of manufacture comprising a base member and a heat-dissipating, low reflectivity, adherent black coating on said base member, said black coating being made by (1) mixing (a) one part by weight of finely divided aluminum, and (b) from 0.35 to 20 parts by weight of an organopolysiloxane resin, (2) applying said mixture to a base member and (3) heating said base member and said mixture in a nonoxidizing atmosphere to a temperature between 660° C. and 1500° C.

4. The method of making a heat-dissipating, low reflectivity, adherent black coating, said method including the steps of (1) mixing (a) one part by weight of finely divided aluminum, and (b) from 0.35 to 20 parts by weight of an organopolysiloxane resin, (2) applying said mixture to a base member, and (3) heating said base member and said mixture in a nonoxidizing atmosphere to a temperature above 660° C.

References Cited in the file of this patent
UNITED STATES PATENTS

| | | |
|---|---|---|
| 2,605,194 | Smith | July 29, 1952 |
| 2,719,355 | Diffenderfer | Oct. 4, 1955 |